(12) United States Patent
Yue et al.

(10) Patent No.: US 11,719,983 B2
(45) Date of Patent: Aug. 8, 2023

(54) DISPLAY PANEL, MANUFACTURING METHOD THEREOF AND DISPLAY DEVICE

(71) Applicant: BOE TECHNOLOGY GROUP CO., LTD., Beijing (CN)

(72) Inventors: Yang Yue, Beijing (CN); Qi Yao, Beijing (CN); Yong Yu, Beijing (CN); Hua Huang, Beijing (CN); Tong Yang, Beijing (CN); Shi Shu, Beijing (CN); Chuanxiang Xu, Beijing (CN); Xue Jiang, Beijing (CN); Haitao Huang, Beijing (CN); Xiang Li, Beijing (CN); Zhao Cui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 147 days.

(21) Appl. No.: 16/986,748

(22) Filed: Aug. 6, 2020

(65) Prior Publication Data
US 2021/0041730 A1   Feb. 11, 2021

(30) Foreign Application Priority Data

Aug. 7, 2019 (CN) .......................... 201910725694.8

(51) Int. Cl.
*G02F 1/1347*   (2006.01)
*G02F 1/1335*   (2006.01)
(Continued)

(52) U.S. Cl.
CPC ........ *G02F 1/1347* (2013.01); *G02F 1/13394* (2013.01); *G02F 1/13396* (2021.01);
(Continued)

(58) Field of Classification Search
CPC ......... G02F 1/133512; G02F 1/133514; G02F 1/133614; G02F 1/133617
See application file for complete search history.

(56) References Cited

U.S. PATENT DOCUMENTS 5,414,545 A * 5/1995 Lee ...................... G02F 1/13471
349/138
10,809,582 B2 * 10/2020 Chen ................... G02F 1/13471
(Continued)

FOREIGN PATENT DOCUMENTS

CN    200976077 Y    11/2007
CN    102116960 A     7/2011
(Continued)

OTHER PUBLICATIONS

First Office Action dated Jul. 28, 2021 corresponding to Chinese application No. 201910725694.8.
Second Office Action dated Feb. 9, 2022 for application No. CN201910725694.8 with English translation attached.

*Primary Examiner* — Paisley L Wilson
(74) *Attorney, Agent, or Firm* — Nath, Goldberg & Meyer; Joshua B. Goldberg (57) ABSTRACT

The present disclosure provides a display panel, a manufacturing method thereof, and a display device. The display panel includes: a first medium and a first spacer wall between the first substrate and the second substrate, wherein the first sub-panel has filter pixels arranged at intervals, the first spacer wall is black and arranged along spaces between filter pixels, and a dielectric coefficient of the first spacer wall is greater than that of the first medium; and a second sub-panel on a light emergent side of the first sub-panel and including a second medium and a second spacer wall between the third substrate and the fourth substrate, wherein the second sub-panel has display pixels arranged at intervals, the second spacer wall is black and arranged along spaces between display pixels, and a dielectric coefficient of the second spacer wall is greater than that of the second medium.

18 Claims, 3 Drawing Sheets

(51) Int. Cl.
   *G02F 1/13357* (2006.01)
   *G02F 1/1339* (2006.01)
   *G02F 1/1343* (2006.01)
   *G02F 1/1362* (2006.01)

(52) U.S. Cl.
   CPC ...... *G02F 1/13398* (2021.01); *G02F 1/13471* (2013.01); *G02F 1/133512* (2013.01); *G02F 1/133514* (2013.01); *G02F 1/133528* (2013.01); *G02F 1/133617* (2013.01); *G02F 1/134309* (2013.01); *G02F 1/136286* (2013.01); *G02F 1/133548* (2021.01); *G02F 1/133614* (2021.01); *G02F 2201/121* (2013.01); *G02F 2201/123* (2013.01)

(56) References Cited

U.S. PATENT DOCUMENTS

| | | | |
|---|---|---|---|
| 2018/0217424 A1* | 8/2018 | Murakoso | G02F 1/133514 |
| 2019/0179204 A1* | 6/2019 | Bang | G02F 1/13471 |
| 2020/0326596 A1* | 10/2020 | Wang | G02F 1/133504 |

FOREIGN PATENT DOCUMENTS

| | | |
|---|---|---|
| CN | 203688948 U | 7/2014 |
| CN | 106950776 A | 7/2017 |
| CN | 108919552 A | 11/2018 |

\* cited by examiner

DISPLAY PANEL, MANUFACTURING METHOD THEREOF AND DISPLAY DEVICE

CROSS-REFERENCE TO RELATED APPLICATION

This application claims the benefit of priority to Chinese Patent Application No. 201910725694.8 filed on Aug. 7, 2019, the contents of which are incorporated herein in their entirety by reference.

TECHNICAL FIELD

The present disclosure relates to the field of display technology, and particularly relates to a display panel, a manufacturing method thereof and a display device.

BACKGROUND

A liquid crystal display device includes an array substrate and a color filter substrate assembled together, and a liquid crystal layer between the array substrate and the color filter substrate. The liquid crystal layer includes liquid crystal molecules. The liquid crystal display device produces an image by applying an electric field to the liquid crystal layer between the array substrate and the color filter substrate. In response to the electric field applied to the liquid crystal layer, the liquid crystal molecules in the liquid crystal layer rotate. Thus, the electric field changes an alignment direction of the liquid crystal molecules in the liquid crystal layer. Light transmittance of the liquid crystal layer is adjusted when the alignment direction of the liquid crystal molecules changes.

SUMMARY

In one aspect, the present disclosure provides a display panel, including:

a first sub-panel including a first substrate and a second substrate opposite to each other, and a first medium and a first spacer wall between the first substrate and the second substrate, wherein the first sub-panel has a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than a dielectric coefficient of the first medium; and a second sub-panel on a light emergent side of the first sub-panel and including a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and is arranged along spaces between the plurality of display pixels, and a dielectric coefficient of the second spacer wall is greater than a dielectric coefficient of the second medium.

In an embodiment of the present disclosure, at least part of the display pixels include a color filter and a fluorescence conversion structure on a light incident side of the color filter, and the fluorescence conversion structure is configured to convert light having a wavelength shorter than a wavelength of light of a color of the display pixel where the fluorescence conversion structure is located into light of the color of the display pixel.

In an embodiment of the present disclosure, a pillow is provided on a side of the fourth substrate facing the third substrate and between the display pixels, and includes at least two filter structures of different colors that are stacked, and the second spacer wall is on a side of the third substrate facing the fourth substrate, and the second spacer wall is in direct contact with the pillow.

In an embodiment of the present disclosure, the pillow includes a first filter structure on the fourth substrate and a second filter structure on a side of the first filter structure away from the fourth substrate, and the first filter structure is a black matrix.

In an embodiment of the present disclosure, the fluorescence conversion structure extends onto the first filter structure and functions as the second filter structure.

In an embodiment of the present disclosure, the pillow includes at least two color filters of different colors that are stacked.

In an embodiment of the present disclosure, at least part of the filter pixels include an auxiliary fluorescence conversion structure, an orthographic projection of the at least part of the filter pixels on the fourth substrate is within an orthographic projection of the at least part of the display pixels on the fourth substrate, and the auxiliary fluorescence conversion structure is configured to convert light of a wavelength shorter than a wavelength of light of a color of the display pixel aligned with the auxiliary fluorescence conversion structure into light of the color of the display pixel.

In an embodiment of the present disclosure, the plurality of filter pixels and the plurality of display pixels are in one to one correspondence in position with each other and have a same size.

In an embodiment of the present disclosure, each of the plurality of filter pixels overlaps at least two display pixels in a thickness direction of the display panel.

In an embodiment of the present disclosure, the second sub-panel includes a plurality of second spacer walls, and the second spacer walls at different positions have different heights.

In an embodiment of the present disclosure, the first medium and the second medium are both liquid crystal;

the second substrate is at a light emergent side of the first sub-panel, and the third substrate is at a light incident side of the second sub-panel;

a first polarizer is arranged on a side of the first substrate away from the second substrate;

a second polarizer is arranged on a side of the fourth substrate away from the third substrate; and an intermediate polarizing structure is arranged between the first medium and the second medium.

In an embodiment of the present disclosure, the filter pixel includes a first common electrode and a first pixel electrode which are arranged on a side of the first substrate facing the second substrate, the first common electrode and the first pixel electrode are stacked, one of the first common electrode and the first pixel electrode, which is away from the first substrate, is a slit electrode, and the other of the first common electrode and the first pixel electrode is a plate electrode;

the display pixel includes a second common electrode and a second pixel electrode which are arranged on a side of the third substrate facing the fourth substrate, the second common electrode and the second pixel electrode are stacked, one of the second common electrode and the second pixel electrode, which is away from the third substrate, is a slit electrode, and the other of the second common electrode and the second pixel electrode is a plate electrode.

In an embodiment of the present disclosure, the second substrate and the third substrate are formed as one substrate.

In an embodiment of the present disclosure, the first medium and the second medium are both liquid crystal;

a first polarizer is arranged on a side of the first substrate away from the second substrate;

a second polarizer is arranged on a side of the fourth substrate away from the third substrate; and the second substrate and the third substrate are provided with a wire grid polarizing structure.

In an embodiment of the present disclosure, the second substrate is at a light emergent side of the first sub-panel, and the third substrate is at a light incident side of the second sub-panel;

the first spacer wall is on a side of the first substrate facing the second substrate; and the second spacer wall is on a side of the third substrate facing the fourth substrate.

In an embodiment of the present disclosure, a plurality of first data lines and a plurality of first gate lines are disposed on the side of the first substrate facing the second substrate, the first data lines and the first gate lines intersect with each other, and an orthographic projection of the first spacer wall on the first substrate covers orthographic projections of the first data lines and the first gate lines on the first substrate; and a plurality of second data lines and a plurality of second gate lines are disposed on a side of the third substrate facing the fourth substrate, the second data lines and the second gate lines intersect with each other, and an orthographic projection of the second spacer wall on the third substrate covers orthographic projections of the second data lines and the second gate lines on the third substrate.

In an embodiment of the present disclosure, the second sub-panel includes color filters of a plurality of colors in the plurality of display pixels, and the color filters are configured to convert light passing therethrough into light of a desired color.

In another aspect, the present disclosure provides a display device including: a display panel according to the present disclosure; and a backlight source on a light incident side of the display panel.

In another aspect, the present disclosure provides a method of manufacturing a display panel, including:

forming a first sub-panel, the first sub-panel including a first substrate and a second substrate opposite to each other, and a first medium and a first spacer wall between the first substrate and the second substrate, wherein the first sub-panel is formed to have a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than a dielectric coefficient of the first medium;

forming a second sub-panel, the second sub-panel including a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and is arranged along spaces between the plurality of display pixels, and a dielectric coefficient of the second spacer wall is greater than a dielectric coefficient of the second medium; and attaching the first sub-panel and the second sub-panel together through a bonding process, wherein the second sub-panel is on a light emergent side of the first sub-panel.

In another aspect, the present disclosure provides a method of manufacturing a display panel, including:

forming a first sub-panel, the first sub-panel including a first substrate and a second substrate opposite to each other, and a first medium and a first spacer wall between the first substrate and the second substrate, wherein the first sub-panel is formed to have a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than a dielectric coefficient of the first medium; and forming a second sub-panel, the second sub-panel including a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and is arranged along spaces between the plurality of display pixels, and a dielectric coefficient of the second spacer wall is greater than a dielectric coefficient of the second medium, wherein the second substrate and the third substrate are formed into one substrate.

DETAILED DESCRIPTION

In order that those skilled in the art will better understand the technical solutions of the present disclosure, the following detailed description of the present disclosure is given with reference to the accompanying drawings and the specific embodiments.

It is to be understood that the specific embodiments and figures described herein are merely illustrative of the present disclosure and are not to be considered as limiting the present disclosure.

It is to be understood that the various embodiments and features of the embodiments in the present disclosure may be combined with each other without conflict.

It is to be understood that, for convenience of description, only portions related to the present disclosure are shown in the drawings of the present disclosure, and portions not related to the present disclosure are not shown in the drawings.

It is to be understood that each unit and module involved in the embodiments of the present disclosure may correspond to only one physical structure, or may be composed of multiple physical structures, or multiple units and modules may be integrated into one physical structure.

Noun Explanation

In the present application, unless otherwise specified, the following technical terms should be understood according to the following explanations:

"patterning process" refers to a step of forming a structure having a specific pattern, which may be a photolithography process including one or more steps of forming a material layer, coating a photoresist, exposing, developing, etching, stripping the photoresist, and the like; for a structure of a non-photosensitive material, a specific pattern needs to be formed through all the above steps; for a structure of a photosensitive material, a specific pattern can be formed only by forming a material layer, exposing and developing without using a photoresist. Needless to say, the patterning process may be an imprinting process, an inkjet printing process, or other processes.

In order to improve the contrast of a liquid crystal display panel, two liquid crystal panels may be stacked together to form a dual-cell display panel. One of the two liquid crystal panels is used to primarily filter light from a backlight, and the other one of the two liquid crystal panels is used to finally filter the light to realize display.

Because the light is filtered twice, the contrast of the dual-cell display panel is very high, which is equivalent to that of an organic light emitting diode (OLED) display panel and may be up to more than 150000:1.

In practical applications, the inventor found that the display effect of the dual-cell display panel is still not ideal. Accordingly, the present disclosure provides, inter alia, a display panel, a display device including the display panel, and a method of manufacturing the display panel.

Referring to FIGS. 1 to 3B, embodiments of the present disclosure provide a display panel including a first sub-panel 1 and a second sub-panel 2.

Figure 3A:
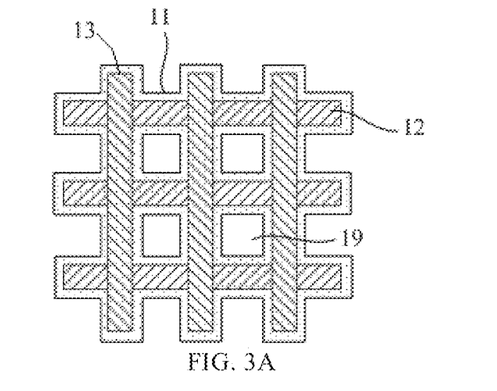
FIG. 3A is a schematic diagram illustrating a positional relationship between a first spacer wall, first gate lines and first data lines in a display panel according to an embodiment of the present disclosure.

The first sub-panel 1 includes a first substrate 81 and a second substrate 82 opposite to each other, and a first medium 18 and a first spacer wall 11 disposed between the first substrate 81 and the second substrate 82. As shown in FIG. 3A, the first sub-panel 1 has a plurality of filter pixels 19 arranged at intervals, and the filter pixels 19 are configured to generate a driving electric field to control light transmittance of the first medium 18. The first spacer wall 11 is black and arranged along spaces between the filter pixels 19, and a dielectric coefficient of the first spacer wall 11 is larger than that of the first medium 18.

The second sub-panel 2 is disposed on a light emergent side of the first sub-panel 1 (an upper side is taken as an example in FIG. 1 and FIG. 2), and includes a third substrate 83 and a fourth substrate 84 opposite to each other, and a second medium 28 and a second spacer wall 21 disposed between the third substrate 83 and the fourth substrate 84. As shown in FIG. 3B, the second sub-panel 2 has a plurality of display pixels 29 arranged at intervals, and the display pixels 29 are configured to generate a driving electric field to control light transmittance of the second medium 28. The second spacer wall 21 is black and arranged along spaces between the display pixels 29, and a dielectric coefficient of the second spacer wall 21 is larger than that of the second medium 28.

Figure 1:
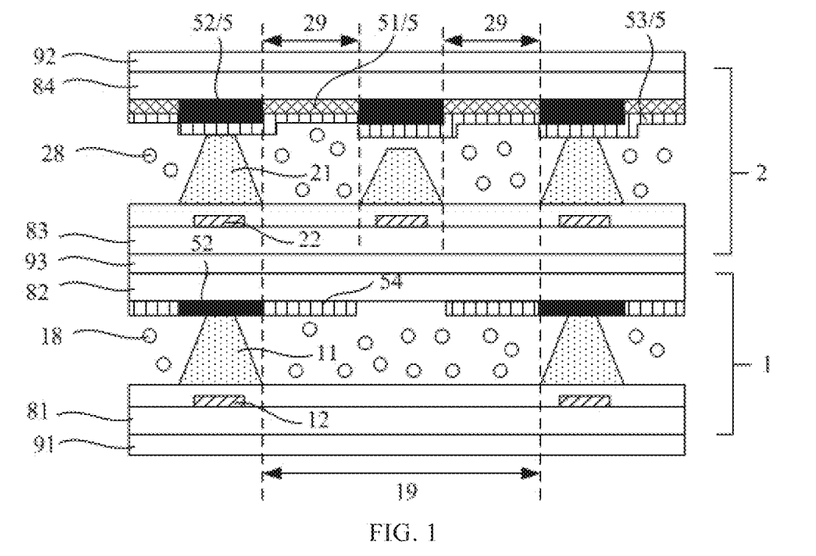
FIG. 1 is a schematic cross-sectional view of a structure of a display panel according to an embodiment of the present disclosure.
Figure 2:
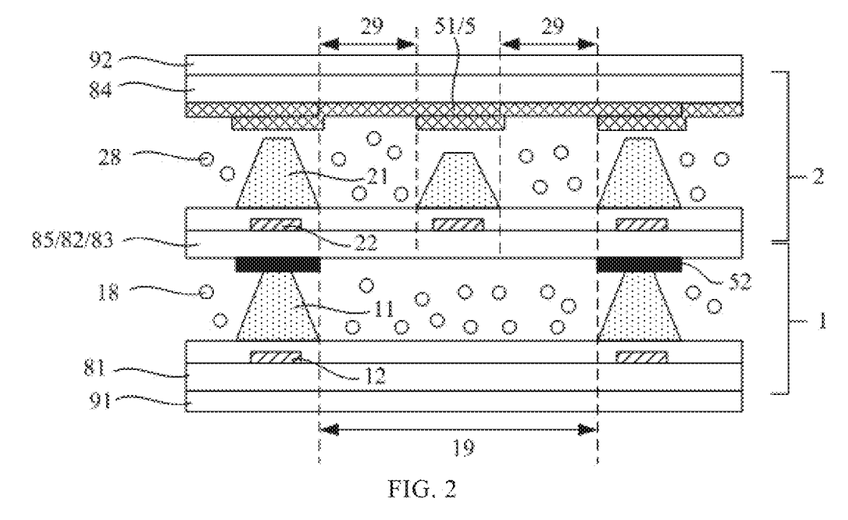
FIG. 2 is a schematic cross-sectional view of a structure of a display panel according to an embodiment of the present disclosure.
Figure 3B:
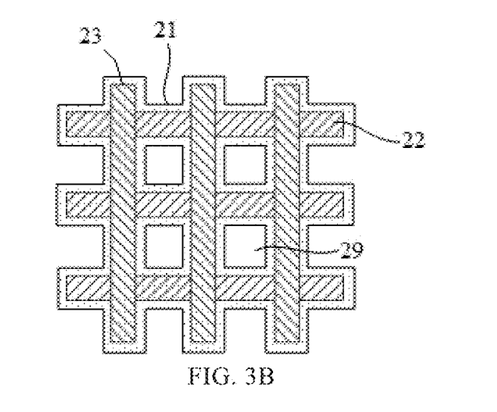
FIG. 3B is a schematic diagram illustrating a positional relationship between a second spacer wall and second gate lines and second data lines in a display panel according to the embodiment of the present disclosure.

The second substrate 82 is located at the light emergent side of the first sub-panel 1, and the third substrate 83 is located on a light incident side of the second sub-panel 2 (a lower side is taken as an example in FIG. 1 and FIG. 2).

The display panel according to the embodiments of the present disclosure is composed of two sub-panels, in each of which the medium (such as liquid crystal) is provided, and the state of the medium is controlled by corresponding pixels (or called sub-pixels) through the driving electric field, so as to controllably filter the light passing through the pixels, thereby realizing display. Thus, the display panel is substantially a dual-cell display panel.

In some embodiments, the pixels in the two sub-panels may be identical in position and size, i.e., filter pixels 19 may correspond one-to-one in position and be identical in size to display pixels 29.

The positions and sizes of the pixels in the two sub-panels may also be different. Generally, since the first sub-panel 1 is used for preliminarily filtering light rather than achieving the final display, the precision requirement is not so high, and the filter pixels 19 in the first sub-panel 1 are larger in size than the display pixels 29 in the second sub-panel 2. In some embodiments, one filter pixel 19 corresponds in position and size to multiple display pixels 29. Referring to FIGS. 1 and 2, one filter pixel 19 completely overlaps two display pixels 29 in a thickness direction of the display panel.

In each of the two sub-panels, a spacer wall (PS Wall) is also provided, and the spacer wall may function as a conventional "spacer (PS)", i.e., to maintain (in particular, supporting) a distance (cell thickness) between two substrates of the sub-panel.

Because the spacer wall is distributed along the intervals between the pixels, the spacer wall is in the form of a continuously distributed 'wall', and even can form a 'mesh', rather than a plurality of independent 'columns'; thus, the medium in each pixel is "enclosed" and separated by the spacer wall.

At the same time, the spacer wall is opaque black and has a dielectric coefficient greater than that of the corresponding medium.

In some embodiments, the spacer wall may be made of a black spacer material, for example, a usable spacer wall material having a dielectric coefficient ε of 3.5, an optical density (OD) in the range of 0.8-2.0, and a resistivity Res greater than 1013 ohm·cm.

The display panel according to the embodiments of the present disclosure is a dual-cell display panel, so that the contrast ratio is higher. In each of the two sub-panels, the spacer wall is arranged at intervals between the corresponding pixels, the spacer wall is black, and light cannot pass through the spacer wall, so that light leakage among different pixels can be prevented. Meanwhile, the spacer wall has a dielectric coefficient higher than that of the medium material, so that the spacer wall can prevent the transmission of an electric field in the spacer wall, prevent light leakage caused by the mutual interference of driving electric fields of different pixels, improve the display effect and increase the aperture ratio.

In some embodiments, the spacer wall has different heights at different positions.

Referring to FIGS. 1 and 2, the heights of the second spacer wall at different positions may be different, and the second spacer wall at some positions is in direct contact with the structure on the fourth substrate to directly play a supporting role (i.e., function as the main spacer wall); the second spacer wall at other positions is spaced apart from the structure on the fourth substrate, so as to support the display panel when the display panel is slightly deformed (i.e., function as the auxiliary spacer wall). In addition, the heights of the first spacer wall at different positions may also be different.

In some embodiments, as shown in FIG. 1, the first medium 18 and the second medium 28 are both liquid crystals; a first polarizer 91 is provided on a side of the first substrate 81 away from the second substrate 82; a second polarizer 92 is provided on a side of the fourth substrate 84 away from the third substrate 83; an intermediate polarizing structure 93 is provided between the first medium 18 and the second medium 28.

That is, the medium in each of the two sub-panels may be liquid crystal, and accordingly, both sub-panels are liquid crystal panels (LCDs). It is necessary to provide "polarizers" on both sides of the liquid crystal panel, i.e., the first polarizer 91 and the second polarizer 92 on both sides of the whole display panel, and the intermediate polarizing structure 93 (which is equivalent to an upper polarizer of the first sub-panel 1 and a lower polarizer of the second sub-panel 2) between the two media.

Referring to FIG. 1, as an implementation of the embodiment, the intermediate polarizing structure 93 is a third polarizer disposed between the second substrate 82 and the third substrate 83.

Referring to FIG. 2, as an implementation of the present embodiment, the second substrate 82 and the third substrate 83 are an integrated intermediate substrate 85.

Obviously, the second substrate 82 and the third substrate 83 may be two independent substrates as shown in FIG. 1, that is, the display panel may actually include four substrates (i.e., four layers of glass).

However, in order to simplify the structure, referring to FIG. 2, the second substrate 82 and the third substrate 83 may be a single structure, i.e., an intermediate substrate 85, and other structures of the two sub-panels are respectively disposed on two sides of the intermediate substrate 85, so that the display panel actually includes three substrates (i.e., three layers of glass).

In some embodiments, the second substrate 82 and the third substrate 83 of the intermediate substrate 85 are provided with wire grid polarizing structures.

When the above intermediate substrate 85 is used and the sub-panel is a liquid crystal panel, the above intermediate polarizing structure 93 may be wire grid polarizers (WGP) provided on one side of the intermediate substrate 85, that is, a linear grating provided on one side of the intermediate substrate 85.

In some embodiments, the filter pixel 19 includes a first common electrode and a first pixel electrode disposed on a side of the first substrate 81 facing the second substrate 82, the first common electrode and the first pixel electrode are stacked, one of the first common electrode and the first pixel electrode away from the first substrate 81 is a slit electrode, and the other of the first common electrode and the first pixel electrode is a plate electrode.

In some embodiments, the display pixel 29 includes a second common electrode and a second pixel electrode disposed on a side of the third substrate 83 facing the fourth substrate 84, the second common electrode and the second pixel electrode are stacked, one of the second common electrode and the second pixel electrode away from the third substrate 83 is a slit electrode, and the other of the second common electrode and the second pixel electrode is a plate electrode.

When the sub-panel is a liquid crystal panel, each pixel may have a common electrode and a pixel electrode (the common electrode and the pixel electrode are insulated from each other by an isolation layer) stacked on the same substrate (not shown). One of the common electrode and the pixel electrode close to the substrate where the common electrode and the pixel electrode are located is in the form of a plate electrode, and one of the common electrode and the pixel electrode away from the substrate where the common electrode and the pixel electrode are located is in the form of a slit electrode, that is, the sub-panel is an advanced super dimension switch (ADS) mode liquid crystal panel. This is because the ADS mode liquid crystal panel generally has a low contrast (e.g., 1000:1 to 2000:1), and is more suitable for use in a dual-cell display panel.

In some embodiments, the sub-panel may also be other liquid crystal panel with higher contrast (e.g., around 5000:1), such as a vertical alignment (VA) mode liquid crystal panel.

In some embodiments, the sub-panel may also be a panel of other type in addition to the liquid crystal panel, such as a polymer dispersed liquid crystal (PDLC) panel, an electrowetting panel, an electrochromic panel, or the like.

Furthermore, it is also possible if the two sub-panels are panels of different types.

In some embodiments, the first spacer wall 11 is disposed on the side of the first substrate 81 facing the second substrate 82; the second spacer wall 21 is provided on the side of the third substrate 83 facing the fourth substrate 84.

In some embodiments, in each of the two sub-panels, the spacer wall is provided on the substrate at the light incident side of the sub-panel, for better light blocking effect.

Furthermore, a plurality of first data lines 13 and a plurality of first gate lines 12 are disposed on the side of the first substrate 81 facing the second substrate 82, the first data lines 13 are disposed to intersect with the first gate lines 12, and orthographic projections of the first data lines 13 and the first gate lines 12 on the first substrate 81 are within an orthographic projection of the first spacer wall 11 on the first substrate 81.

A plurality of second data lines 23 and a plurality of second gate lines 22 are disposed on the side of the third substrate 83 facing the fourth substrate 84, the second data lines 23 are disposed to intersect with the second gate lines 22, and orthographic projections of the second data lines 23 and the second gate lines 22 on the third substrate 83 are within an orthographic projection of the second spacer wall 21 on the third substrate 83.

In each sub-panel, referring to FIGS. 3A and 3B, gate lines and data lines respectively extending in two directions (e.g., the gate lines extending in a row direction, and the data lines extending in a column direction) and intersecting with each other may be provided, so that corresponding pixels are defined at intersections of the gate lines and the data lines. In order to prevent the electric fields of the gate lines and the data lines from affecting the medium (e.g., liquid crystal) in the pixel, the spacer wall may directly cover the corresponding gate lines and data lines. In some embodiments, the first spacer wall 11 directly covers the first gate lines 12 and the first data lines 13, and the second spacer wall 21 directly covers the second gate lines 22 and the second data lines 23.

In some embodiments, on the side of the fourth substrate 84 facing the third substrate 83, there is provided with a multi-color filter structure 5 for converting transmitted light into light of a desired color.

In order to realize color display, a filter structure 5 for changing the color of light may be provided on the fourth substrate 84 at the light emergent side of the second sub-panel 2, for example, a color filter (CF) 51 may be provided in the region of each display pixel 29, and a black matrix (BM) 52 (equivalent to a filter structure 5 that does not allow light to pass) may be provided in the region between the display pixels 29.

Further, in the region between the display pixels 29, the filter structures 5 of at least two different colors are stacked to form pillows, the pillows are in direct contact with the second spacer wall 21, and the orthographic projections of the pillows on the fourth substrate 84 overlap with the orthographic projection of the second spacer wall 21 on the fourth substrate 84.

When the sub-panel is deformed, the spacer wall may slide into the pixel to damage the alignment layer (PI) and other structures, thereby causing display defects (e.g., generating a bright dot corresponding to the color of the pixel). As such, referring to FIGS. 1 and 2, a plurality of filter structures 5 of different colors may be stacked on the fourth substrate 84 in a region corresponding to the second spacer wall 21. Since there is only a filter structure 5 of one color in a typical pixel, the thickness of the stack of the plurality of filter structures 5 is necessarily large to form a pillow, so that the spacer wall is butted against the pillow and do not damage the structures in the pixel even in the case of sliding.

In the present disclosure, the form of the filter structures 5 forming the pillow is various, for example, referring to FIG. 2, a plurality of color filters 51 of different colors are stacked to form the pillow, or referring to FIG. 1, the black matrix 52 and other filter structure 5 are stacked to form the pillow.

In some embodiments, within at least part of the display pixels 29, the filter structure 5 includes:

a color filter 51 having the same color as the display pixel 29 where the color filter is located; and a fluorescence conversion structure 53, which is located on the light incident side of the color filter 51, and is configured to convert light, having a wavelength shorter than that of light of the color of the display pixel 29 in which the fluorescence conversion structure 53 is located, into light of the color of the display pixel 29.

To improve the utilization rate of light and increase the transmittance of the display panel, referring to FIG. 1, the fluorescence conversion structures 53 are disposed on the light incident side of the color filters 51 of the display pixels 29 of part of the colors, and the fluorescence conversion structures 53 are configured to absorb light with shorter wavelength (i.e., higher energy) and convert it into light with longer wavelength (i.e., lower energy) as required, for example, convert blue light into red light, green light, etc.

Obviously, since the fluorescence conversion structure 53 needs to perform light conversion, it is necessarily located on the light incident side of the color filter 51 (otherwise, it only receives light of the corresponding color, but cannot perform light conversion).

Meanwhile, since the wavelength of the light (blue light) corresponding to the blue pixel is the shortest in the visible light range, the backlight source does not emit light with a wavelength shorter than that of blue light, that is, blue light cannot be obtained through light conversion by the fluorescent conversion structure 53, and therefore, the fluorescent conversion structure 53 may not be disposed in the blue pixel, and only the color filter 51 of the corresponding color is disposed in the blue pixel.

The fluorescence conversion structure 53 may be made of a corresponding fluorescent material according to different colors. As an example, a Cy-series fluorescent dye is used, for example, a Cy5 fluorescent dye is used for the fluorescence conversion structure 53 corresponding to the red pixel, and a Cy2 fluorescent dye is used for the fluorescence conversion structure 53 corresponding to the green pixel.

Figure 4:
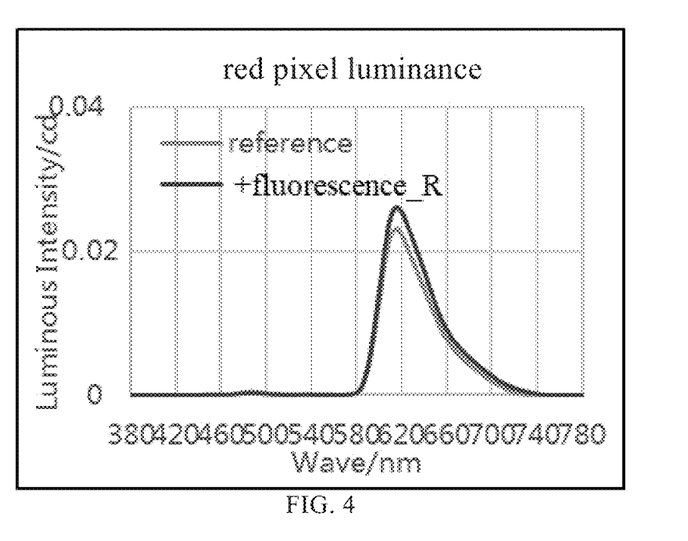
FIG. 4 is a schematic diagram illustrating brightness enhancement after using a fluorescence conversion structure in a display panel according to an embodiment of the present disclosure.
Figure 5:
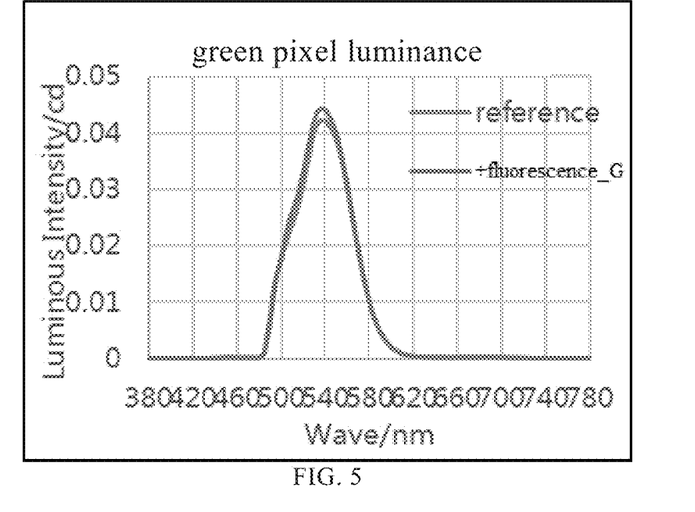
FIG. 5 is a schematic diagram illustrating brightness enhancement after using a fluorescence conversion structure in a display panel according to an embodiment of the present disclosure.

In FIGS. 4 and 5, the "reference" curve indicates the light intensities (luminances) of the red and green pixels of the conventional display panel at the respective wavelengths, and the "+fluorescence_R" and "+fluorescence_G" curves indicate the light intensities (luminances) of the red and green pixels at the respective wavelengths after the corresponding fluorescence conversion structures are added to the conventional display panel, respectively. It can be seen that, after the fluorescent conversion structure is added, the luminance of the red pixel is improved by 19.74%, and the light intensity of the green pixel is improved by 4.77%. Here, the luminance improvement=(L2−L1)/L1, where L1 is the luminance of the corresponding pixel in the conventional display panel, and L2 is the luminance of the corresponding pixel after the corresponding fluorescent conversion structure is added in the conventional display panel.

Further, in regions corresponding to at least part of the filter pixels 19, an auxiliary fluorescence conversion structure 54 is provided on the side of the second substrate 82 facing the first substrate 81, and is configured to convert light having a wavelength shorter than the wavelength of light of the color of the display pixel 29 to which the auxiliary fluorescence conversion structure 54 corresponds light of the color of the display pixel 29.

In order to further improve the light utilization efficiency, referring to FIG. 1, a corresponding auxiliary fluorescence conversion structure 54 may also be disposed on the second substrate 82 at the light emergent side of the first sub-panel 1. Although the auxiliary fluorescence conversion structure 54 is disposed in the first sub-panel 1, the position, color and the like of the auxiliary fluorescence conversion structure should correspond to the display pixel 29 in the second sub-panel 2.

Referring to FIG. 1, when the filter structure 5 includes the fluorescence conversion structure 53, the above pillow may also be formed by the stack of the fluorescence conversion structure 53 and other filter structure 5 (e.g., the black matrix 52).

Needless to say, many other structures, such as a thin film transistor, a passivation layer, an interlayer insulating layer, an overcoat layer, an alignment layer, etc., may be included in the display panel, and will not be described in detail herein.

The embodiments of the present disclosure provide a method of manufacturing the display panel, which includes:

forming a first sub-panel, the first sub-panel including a first substrate and a second substrate opposite to each other, and a first medium and a first spacer wall between the first substrate and the second substrate, wherein the first sub-panel is formed to be provided with a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than that of the first medium; and forming a second sub-panel, the second sub-panel including a third substrate and a fourth substrate opposite to each other, and a second medium and a second spacer wall between the third substrate and the fourth substrate, wherein the second sub-panel is formed to have a plurality of display pixels which are arranged at intervals, and the display pixels are configured to generate a driving electric field to control light transmittance of the second medium; the second spacer wall is black and arranged along spaces between the plurality of display pixels, and a dielectric coefficient of the second spacer wall is greater than that of the second medium; and attaching the first sub-panel and the second sub-panel together through a bonding process, wherein the second sub-panel is on a light emergent side of the first sub-panel.

The embodiments of the present disclosure further provide a manufacturing method of the display panel, which includes:

forming a first sub-panel, the first sub-panel including a first substrate and a second substrate opposite to each other, and a first medium and a first spacer wall between the first substrate and the second substrate, wherein the first sub-panel is formed to have a plurality of filter pixels which are arranged at intervals, and the filter pixels are configured to generate a driving electric field to control light transmittance of the first medium; the first spacer wall is black and arranged along spaces between the plurality of filter pixels, and a dielectric coefficient of the first spacer wall is greater than that of the first medium; and forming a second sub-panel, the second sub-panel including a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and arranged along spaces between the plurality of display pixels, and a dielectric coefficient of the second spacer wall is greater than that of the second medium, wherein the second substrate and the third substrate are formed into one substrate.

In some embodiments, the method of manufacturing a display panel may include the following steps.

At step S2001, a gate electrode (GATE) and a first gate line are formed on a first substrate through a patterning process.

At step S2002, a gate insulating layer (GI) is formed on the first substrate.

At step S2003, an active layer (ACT) is formed on the first substrate through a patterning process.

At step S2004, an interlayer insulating layer is formed on the first substrate through a patterning process.

At step S2005, a source electrode, a drain electrode, and a first data line (DATA) are formed on the first substrate through a patterning process.

At step S2006, a passivation layer (PVX) is formed on the first substrate through a patterning process.

At step S2007, a first pixel electrode (ITO) is formed on the first substrate through a patterning process.

At step S2008, an isolation layer is formed on the first substrate.

At step S2009, a first common electrode (ITO) is formed on the first substrate through a patterning process.

At step S2010, an overcoat layer (OC) is formed on the first substrate.

At step S2011, an alignment layer (PI) is formed on the first substrate.

At step S2012, a first spacer wall is formed on the first substrate through a patterning process.

At step S2101, a wire grid polarizing structure is formed on a first side of an intermediate substrate through a patterning process.

At step S2102, a black matrix (BM) is formed on the first side of the intermediate substrate (serving as both the second substrate and the third substrate) through a patterning process.

At step S2103, an auxiliary fluorescent conversion structure of respective colors (e.g., red, green) is formed on the first side of the intermediate substrate through a patterning process.

At step S2104, an overcoat layer (OC) is formed on the first side of the intermediate substrate.

At step S2105, an alignment layer (PI) is formed on the first side of the intermediate substrate.

At step S2106, a gate electrode (GATE) and a second gate line are formed on a second side of the intermediate substrate through a patterning process.

At step S2107, a gate insulating layer (GI) is formed on the second side of the intermediate substrate through a patterning process.

At step S2108, an active layer (ACT) is formed on the second side of the intermediate substrate through a patterning process.

At step S2109, an interlayer insulating layer is formed on the second side of the intermediate substrate.

At step S2110, a source electrode, a drain electrode, and a second data line (DATA) are formed on the second side of the intermediate substrate through a patterning process.

At step S2111, a passivation layer (PVX) is formed on the second side of the intermediate substrate through a patterning process.

At step S2112, a second pixel electrode (ITO) is formed on the second side of the intermediate substrate through a patterning process.

At step S2113, an isolation layer is formed on the second side of the intermediate substrate.

At step S2114, a second common electrode (ITO) is formed on the second side of the intermediate substrate through a patterning process.

At step S2115, an overcoat layer (OC) is formed on the second side of the intermediate substrate.

At step S2116, an alignment layer (PI) is formed on the second side of the intermediate substrate.

At step S2117, a second spacer wall is formed on the second side of the intermediate substrate.

At step S2201, a black matrix (BM) is formed on a fourth substrate through a patterning process.

At step S2202, color filters (CF) of respective colors (e.g., red, green, blue) are formed on the fourth substrate through a patterning process.

At step S2203, a fluorescent conversion structure of respective colors (e.g., red, green) is formed on the fourth substrate through a patterning process.

At step S2204, an overcoat layer (OC) is formed on the fourth substrate.

At step S2205, an alignment layer (PI) is formed on the fourth substrate.

At step S2301, the first substrate, the intermediate substrate (serving as both the second substrate and the third substrate), and the fourth substrate are assembled.

At step S2302, liquid crystal is filled between the first substrate and the intermediate substrate, and liquid crystal is filled between the intermediate substrate and the fourth substrate.

At step S2303, a first polarizer is attached to an outer side of the first substrate, and a second polarizer is attached to an outer side of the second substrate.

Embodiments of the present disclosure provide a display device, which includes:
the display panel described above; and
a backlight source arranged on a light incident side of the display panel.

In the present disclosure, the display device may be any product or component having a display function, such as an electronic paper, a mobile phone, a tablet computer, a television, a display, a notebook computer, a digital photo frame, a navigator, or the like.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A display panel, comprising:
a first sub-panel, comprising a first substrate and a second substrate opposite to each other, and a first medium and a first spacer wall between the first substrate and the second substrate, wherein the first sub-panel has a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than a dielectric coefficient of the first medium; and
a second sub-panel on a light emergent side of the first sub-panel and comprising a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and is arranged along spaces between the plurality of display pixels, and a dielectric coefficient of the second spacer wall is greater than a dielectric coefficient of the second medium,
wherein the second substrate is closer to the second sub-panel than the first substrate, the third substrate is closer to the first sub-panel than the fourth substrate, the first spacer wall is disposed on the first substrate at a side of the first substrate facing the second substrate, the second spacer wall is disposed on the third substrate at a side of the third substrate facing the fourth substrate, and an orientation of the first spacer wall is the same as an orientation of the second spacer wall,
a size of the first spacer wall decreases along a direction pointing from the first substrate to the second substrate, and a size of the second spacer wall decreases along a direction pointing from the third substrate to the fourth substrate,
at least part of the filter pixels comprise an auxiliary fluorescence conversion structure, an orthographic projection of the at least part of the filter pixels on the fourth substrate covers orthographic projections of at least two of the display pixels on the fourth substrate, an orthographic projection of the auxiliary fluorescence conversion structure on the fourth substrate completely coincides with the orthographic projections of the at least two of the display pixels on the fourth substrate, and the auxiliary fluorescence conversion structure is configured to convert light of a wavelength shorter than a wavelength of light of a color of the display pixel aligned with the auxiliary fluorescence conversion structure into light of the color of the display pixel.

2. The display panel of claim 1, wherein at least part of the display pixels comprise a color filter and a fluorescence conversion structure on a light incident side of the color filter, and the fluorescence conversion structure is configured to convert light having a wavelength shorter than a wavelength of light of a color of the display pixel where the fluorescence conversion structure is located into light of the color of the display pixel.

3. The display panel of claim 2, wherein a pillow is on a side of the fourth substrate facing the third substrate and between the display pixels, and comprises at least two filter structures of different colors that are stacked, and
the second spacer wall is on a side of the third substrate facing the fourth substrate, and the second spacer wall is in direct contact with the pillow.

4. The display panel of claim 3, wherein the pillow comprises a first filter structure on the fourth substrate and a second filter structure on a side of the first filter structure away from the fourth substrate, and the first filter structure is a black matrix.

5. The display panel of claim 4, wherein the fluorescence conversion structure extends onto the first filter structure and functions as the second filter structure.

6. The display panel of claim 3, wherein the pillow comprises at least two color filters of different colors that are stacked.

7. The display panel of claim 1, wherein each of the plurality of filter pixels overlaps at least two display pixels in a thickness direction of the display panel.

8. The display panel of claim 1, wherein
the second sub-panel comprises a plurality of second spacer walls, and the second spacer walls at different positions have different heights.

9. The display panel of claim 1, wherein
the first medium and the second medium are both liquid crystal;
the second substrate is at a light emergent side of the first sub-panel, and the third substrate is at a light incident side of the second sub-panel;
a first polarizer is on a side of the first substrate away from the second substrate;
a second polarizer is on a side of the fourth substrate away from the third substrate; and
an intermediate polarizing structure is between the first medium and the second medium.

10. The display panel of claim 9, wherein
the filter pixel comprises a first common electrode and a first pixel electrode which are on a side of the first substrate facing the second substrate, the first common electrode and the first pixel electrode are stacked, one of the first common electrode and the first pixel electrode, which is away from the first substrate, is a slit electrode, and the other of the first common electrode and the first pixel electrode is a plate electrode; and
the display pixel comprises a second common electrode and a second pixel electrode which are on a side of the third substrate facing the fourth substrate, the second common electrode and the second pixel electrode are stacked, one of the second common electrode and the second pixel electrode, which is away from the third substrate, is a slit electrode, and the other of the second common electrode and the second pixel electrode is a plate electrode.

11. The display panel of claim 1, wherein
the second substrate and the third substrate are formed as one substrate.

12. The display panel of claim 11, wherein
the first medium and the second medium are both liquid crystal;
a first polarizer is on a side of the first substrate away from the second substrate;
a second polarizer is on a side of the fourth substrate away from the third substrate; and
the second substrate and the third substrate are provided with a wire grid polarizing structure.

13. The display panel of claim 1, wherein
the second substrate is at a light emergent side of the first sub-panel, and the third substrate is at a light incident side of the second sub-panel.

14. The display panel of claim 13, wherein
a plurality of first data lines and a plurality of first gate lines are on the side of the first substrate facing the second substrate, the first data lines and the first gate lines intersect with each other, and an orthographic projection of the first spacer wall on the first substrate covers orthographic projections of the first data lines and the first gate lines on the first substrate; and
a plurality of second data lines and a plurality of second gate lines are on the side of the third substrate facing the fourth substrate, the second data lines and the second gate lines intersect with each other, and an orthographic projection of the second spacer wall on the third substrate covers orthographic projections of the second data lines and the second gate lines on the third substrate.

15. The display panel of claim 1, wherein
the second sub-panel comprises color filters of a plurality of colors in the plurality of display pixels, and the color filters are configured to convert transmitted light into light of a desired color.

16. A display device, comprising:
the display panel of claim 1, and
a backlight source on a light incident side of the display panel.

17. A method of manufacturing a display panel, comprising:
forming a first sub-panel, the first sub-panel comprising a first substrate and a second substrate opposite to each other, and a first medium and a first spacer wall between the first substrate and the second substrate, wherein the first sub-panel is formed to have a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than a dielectric coefficient of the first medium;
forming a second sub-panel, the second sub-panel comprising a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and is arranged along spaces between the plurality of display pixels, and a dielectric coefficient of the second spacer wall is greater than a dielectric coefficient of the second medium; and
attaching the first sub-panel and the second sub-panel together through a bonding process, wherein the second sub-panel is on a light emergent side of the first sub-panel,
wherein the second substrate is closer to the second sub-panel than the first substrate, the third substrate is closer to the first sub-panel than the fourth substrate, the first spacer wall is disposed on the first substrate at a side of the first substrate facing the second substrate, the second spacer wall is disposed on the third substrate at a side of the third substrate facing the fourth substrate, and an orientation of the first spacer wall is the same as an orientation of the second spacer wall,
a size of the first spacer wall decreases along a direction pointing from the first substrate to the second substrate, and a size of the second spacer wall decreases along a direction pointing from the third substrate to the fourth substrate,
at least part of the filter pixels comprise an auxiliary fluorescence conversion structure, an orthographic projection of the at least part of the filter pixels on the fourth substrate covers orthographic projections of at least two of the display pixels on the fourth substrate, an orthographic projection of the auxiliary fluorescence conversion structure on the fourth substrate completely coincides with the orthographic projections of the at least two of the display pixels on the fourth substrate, and the auxiliary fluorescence conversion structure is configured to convert light of a wavelength shorter than a wavelength of light of a color of the display pixel aligned with the auxiliary fluorescence conversion structure into light of the color of the display pixel.

18. A method of manufacturing a display panel, comprising:
forming a first sub-panel, the first sub-panel comprising a first substrate and a second substrate opposite to each other, and a first medium and a first spacer wall between the first substrate and the second substrate, wherein the first sub-panel is formed to have a plurality of filter pixels which are arranged at intervals, and the filter pixels are configured to generate a driving electric field to control light transmittance of the first medium; the first spacer wall is black and is arranged along spaces between the plurality of filter pixels, and a dielectric coefficient of the first spacer wall is greater than a dielectric coefficient of the first medium; and
forming a second sub-panel, the second sub-panel comprising a third substrate and a fourth substrate opposite to each other, and a second medium and a second spacer wall between the third substrate and the fourth substrate, wherein the second sub-panel has a plurality of display pixels which are arranged at intervals, and the display pixels are configured to generate a driving electric field to control light transmittance of the second medium; the second spacer wall is black and is arranged along spaces between the plurality of display pixels, and a dielectric coefficient of the second spacer wall is greater than a dielectric coefficient of the second medium, wherein the second substrate and the third substrate are formed into one substrate, and wherein the second substrate is closer to the second sub-panel than the first substrate, the third substrate is closer to the first sub-panel than the fourth substrate, the first spacer wall is disposed on the first substrate at a side of the first substrate facing the second substrate, the second spacer wall is disposed on the third substrate at a side of the third substrate facing the fourth substrate, and an orientation of the first spacer wall is the same as an orientation of the second spacer wall, a size of the first spacer wall decreases along a direction pointing from the first substrate to the second substrate, and a size of the second spacer wall decreases along a direction pointing from the third substrate to the fourth substrate, at least part of the filter pixels comprise an auxiliary fluorescence conversion structure, an orthographic projection of the at least part of the filter pixels on the fourth substrate covers orthographic projections of at least two of the display pixels on the fourth substrate, an orthographic projection of the auxiliary fluorescence conversion structure on the fourth substrate completely coincides with the orthographic projections of the at least two of the display pixels on the fourth substrate, and the auxiliary fluorescence conversion structure is configured to convert light of a wavelength shorter than a wavelength of light of a color of the display pixel aligned with the auxiliary fluorescence conversion structure into light of the color of the display pixel.

* * * * *